United States Patent
Cobanoglu et al.

(10) Patent No.: US 10,698,532 B2
(45) Date of Patent: Jun. 30, 2020

(54) STRETCHABLE TOUCHPAD OF THE CAPACITIVE TYPE

(71) Applicant: Sanko Tekstil Isletmeleri San. Ve Tic. A.S., Inegol-Bursa (TR)

(72) Inventors: Özgür Cobanoglu, Inegol-Bursa (TR); Leyla Zengi, Inegol-Bursa (TR); Günes Banazili, Inegol-Bursa (TR); Merve Nagihan Akcay, Inegol-Bursa (TR); Kenan Loyan, Inegol-Bursa (TR); Özgür Akdemir, Inegol-Bursa (TR); Fehim Caglar, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 0 days.

(21) Appl. No.: 15/880,632

(22) Filed: Jan. 26, 2018

(65) Prior Publication Data

US 2018/0217715 A1    Aug. 2, 2018

(30) Foreign Application Priority Data

Jan. 27, 2017 (EP) .................................. 17153443

(51) Int. Cl.
*G06F 3/041* (2006.01)
*G01B 7/16* (2006.01)
(Continued)

(52) U.S. Cl.
CPC ......... *G06F 3/0418* (2013.01); *D03D 1/0088* (2013.01); *G01B 7/22* (2013.01);
(Continued)

(58) Field of Classification Search
CPC .......... D03D 1/0088; A61B 5/00; G01B 7/16; G01B 7/22; G01L 1/14; G01L 1/146;
(Continued)

(56) References Cited

U.S. PATENT DOCUMENTS

2009/0282671 A1* 11/2009 Tao ........................ D06M 11/74
29/621.1
2015/0294756 A1   10/2015 Ben Shalom et al.
(Continued)

FOREIGN PATENT DOCUMENTS

GB         2443208         4/2008

OTHER PUBLICATIONS

International Search Report dated Apr. 4, 2018 for corresponding PCT/EP2018/051800.

(Continued)

*Primary Examiner* — Mark Edwards
(74) *Attorney, Agent, or Firm* — Silvia Salvadori

(57) ABSTRACT

It is disclosed a stretchable touchpad (10) of the capacitive type including a stretchable textile fabric (20) having a plurality of conductive elements incorporated therein. The conductive elements are resistive strain gauges (30, 40) which form electrodes to detect a change of capacitance caused by a touch. It is also disclosed a method for operating a stretchable touchpad (10) comprising the steps of measuring continuously a capacitance analog signal provided by a resistive strain gauge (30, 40) of the stretchable touchpad (10); and comparing the measured capacitance signal with a threshold value in order to determine whether or not a touch has taken place, wherein the threshold value is continuously adjusted as a function of the actual measurement of capacitance and as a function of the resistance of said resistive strain gauges (30, 40) which form the capacitor electrodes of said touchpad (10).

10 Claims, 3 Drawing Sheets

(51) Int. Cl.
- *G01L 1/14* (2006.01)
- *D03D 1/00* (2006.01)
- *G01L 1/20* (2006.01)
- *G06F 3/0354* (2013.01)
- *G01L 1/22* (2006.01)
- *G01L 1/26* (2006.01)
- *G06F 1/16* (2006.01)
- *G06F 3/044* (2006.01)
- *G06F 3/045* (2006.01)

(52) U.S. Cl.
CPC ............... *G01L 1/14* (2013.01); *G01L 1/146* (2013.01); *G01L 1/205* (2013.01); *G01L 1/2268* (2013.01); *G01L 1/26* (2013.01); *G06F 1/163* (2013.01); *G06F 1/1643* (2013.01); *G06F 1/1652* (2013.01); *G06F 3/03547* (2013.01); *G06F 3/044* (2013.01); *G06F 3/045* (2013.01); *G06F 3/0414* (2013.01); *D10B 2403/02431* (2013.01); *G06F 2203/04102* (2013.01)

(58) Field of Classification Search
CPC ......... G01L 1/20; G01L 1/205; G01L 1/2268; G01L 1/26; G06F 1/163; G06F 1/1643; G06F 1/1652; G06F 3/03547; G06F 3/041; G06F 3/0414; G06F 3/044; G06F 3/045; G06F 3/0418; G06F 2203/04102; D10B 2403/02431
USPC .......................................................... 345/174
See application file for complete search history.

(56) References Cited

U.S. PATENT DOCUMENTS

| | | |
|---|---|---|
| 2016/0018274 A1 | 1/2016 | Seitz |
| 2016/0048235 A1* | 2/2016 | Poupyrev ............... G06F 3/044 345/174 |
| 2016/0328043 A1 | 11/2016 | Moller |
| 2017/0176167 A1* | 6/2017 | Keller ..................... G01B 7/18 |
| 2018/0329535 A1* | 11/2018 | Vallett .................... G06F 3/044 |

OTHER PUBLICATIONS

Priority European Search Report dated Jul. 25, 2017 for EP No. 17153443.1.
International Preliminary Reprt on patentability dated Aug. 8, 2019 for corresponding PCT/EP2018/051800.

* cited by examiner

STRETCHABLE TOUCHPAD OF THE CAPACITIVE TYPE

RELATED APPLICATION

This application claims priority to European application EP 17153443.1 filed 27 Jan. 2017, the contents of which are hereby incorporated by reference as if set forth in their entirety.

TECHNICAL FIELD

The present invention relates to a stretchable touchpad of the capacitive type.

BACKGROUND

Stretchable resistive fabrics or elastomers as strain gauges are known in the art. Touch sensors implemented with conducting materials are also known in the art. In these applications, electrostatic discharge (ESD) protection of the electronics input stage is established generally by a resistor in series with each of the capacitive sensor traces.

It is also known that touch sensors are generally implemented on solid state or stiff substrates and are generally not wearable. Strain gauges are implemented always on stretchable substrates due to the nature dictated by the function of a strain gauge.

US2016018274 discloses a textile pressure sensor comprising knit metal stitches and designed to be elastic both in the longitudinal direction and in the transverse direction. The knitted fabrics of the textile pressure sensor configure a first and a second structure that are conductive at least in regions thereof. An intermediate isolating element is arranged between the first and the second conductive structures. Both the surface and the capacitance of this textile pressure sensor are not constant due to the fact that the textile structure can be extended in the various directions. This can lead to errors in the pressure measurement. Accordingly, the effects of these extensions have to be compensated for example through an extension measurement.

In particular, the above-mentioned document describes the use of an array of strain gauges to measure the amount of elongation of the textile fabric to compensate for the capacity variation which in turn affects the calculated pressure.

However, the main aim of the above prior art textile pressure sensor is to measure pressure or, more precisely, pressure distribution along the fabric by using capacitance between electrodes as the phenomenon to indirectly measure pressure.

US2015294756 discloses a flexible pressure detection platform comprising at least one layer of insulating material sandwiched between a first electrode layer and a second electrode layer, each electrode layer comprising an array of strip electrodes embedded in a flexible material. Pressure is measured based on capacitance change at the intersection of specific vertical and horizontal conductive stripes.

US20160048235 describes interactive textiles. The interactives textiles include a grid of conductive thread woven into the interactive textile to forma a capacitive touch sensor that is configured to detect touch input. Detected touch inputs can be used to control remote devices.

SUMMARY OF THE INVENTION

It is an aim of the present invention to create a stretchable fabric that may operate as a touch sensor and/or as a strain gauge.

This and other aims are achieved by a stretchable touchpad of the capacitive type including a uni- or bi-directionally stretchable textile fabric having a plurality of conductive elements incorporated therein, characterized in that said conductive elements are resistive strain gauges which form electrodes that provide a change of capacitance signal caused by a touch.

An advantage of this embodiment is that the above structure combines the functions of a touch pad, namely of a device that can be used as a touch input device and of strain gauges which make it possible to measure the elongation of the surface stretchable touchpad and the location, the direction, and the surface of such elongation in 3D.

More specifically, the presence of the strain gauges allows correcting for capacitance variation of the individual touch sensors upon stretching events as well. Therefore, the function of the stretchable touchpad is twofold: i) provide correction for touch sensors, and ii) monitor the elongation of the fabric and the direction of such elongation.

In another embodiment of the invention, the resistive strain gauges are disposed along perpendicular directions in a bi-directional array and an insulating material is placed at the crossing points of said resistive strain gauges.

An advantage of this embodiment is that, due to the fact that strain gauges are also flexible resistors in this specific case, electrostatic discharge (ESD) protection resistors are not needed to read out the output of the touch sensor.

In a further embodiment of the invention, the resistive strain gauges comprise resistive elastomeric coatings printed onto the stretchable textile fabric.

The resistive strain gauges in another embodiment may also comprise resistive elastomeric coatings screen printed onto stripes.

The stretchable textile fabric may also have different elongation properties in two perpendicular directions.

The invention also relates to a method for operating a stretchable touchpad as above described, the method comprising the steps of:

measuring continuously a capacitance analog signal provided by the stretchable touchpad; and comparing the measured capacitance signal with a threshold value in order to determine whether or not a touch has taken place, wherein said threshold value is continuously adjusted as a function of the resistance of resistive strain gauges which form the capacitor electrodes of said touchpad.

An advantage of this embodiment is that it allows obtaining a better sensitivity in detecting binary touch events by adjusting the touch event detection algorithm as a function of the variation of the resistance of the strain gauges.

According to the invention, the method further comprises the steps of:

measuring a variation of the electrical resistance of a resistive strain gauge;

using the measured variation of electrical resistance as elongation to correct a parasitic capacitance error due to the elongation of the resistive strain gauges.

Preferred embodiments are the object of dependent claims.

BRIEF DESCRIPTION OFF THE DRAWING

The invention will now be described in greater detail, by way of example, with reference to the accompanying non-limiting schematic drawings, wherein like numerals denote like elements, and in which.

DETAILED DESCRIPTION

Exemplary embodiments will now be described with reference to the enclosed drawings without intent to limit application and uses.

Figure 1A:
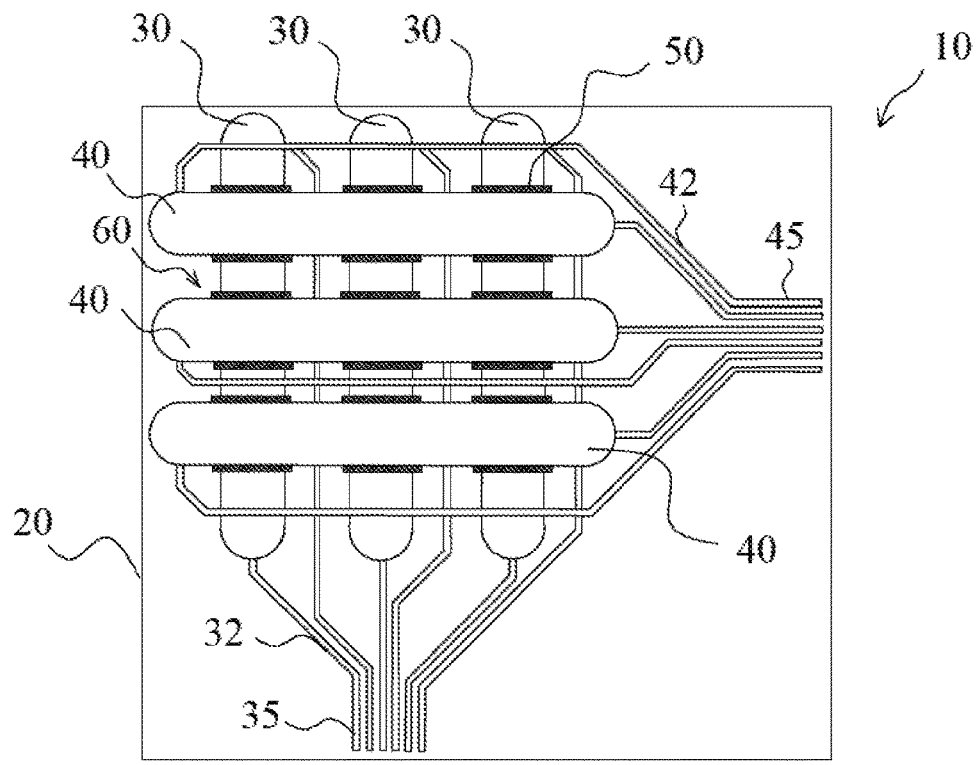
FIG. 1a shows a stretchable touchpad of the capacitive type according to a first embodiment of the invention.

In FIG. 1a a stretchable touchpad 10 of the capacitive type is represented, wherein the stretchable touchpad 10 includes a stretchable textile fabric 20 having a plurality of conductive elements incorporated therein.

Each of the conductive elements 30 has two ports since electrical current flows through each element 30 causing a voltage drop across the ports, each element having therefore two routings 32, one entering the respective element 30 and one exiting from it and also having two contact pads 35.

In a similar fashion, each of the conductive elements 40 has two routings 42, one entering the respective element 30 and one exiting from it and also having two contact pads 45.

In particular, the conductive elements may be resistive strain gauges 30, 40 which form electrodes suitable to provide a change of capacitance signal caused by a touch.

The resistive strain gauges 30, 40 may provide a signal representative of such change of capacitance to a control unit 90.

The control unit 90 is designed to measure in continuous such signals and interpret them as touch events by comparing such signals to a variable threshold value, the threshold value being a function both of the actual measurement of capacitance and of the resistance of resistive strain gauges which form the capacitor electrodes of the touchpad 10.

The stretchable textile fabric 20 may have different elongation properties in two perpendicular directions.

The resistive strain gauges 30, 40 are disposed along perpendicular directions in a bi-directional array and an insulating material 50 is placed at the crossing points 60 of the resistive strain gauges 30, 40.

The resistive strain gauges 30, 40 may comprise resistive elastomeric coatings printed onto the stretchable textile fabric 20 or printed onto stretchable stripes incorporated into the fabric.

In this way, stretchable resistive strain gauges 30, 40 are created which, in contrast to metallic electrical conductor wire, can stretch or elongate as much as the textile material to which are applied and whose electrical resistance changes as a function of the applied elongation.

Moreover, the resistive strain gauges 30, 40 may comprise or consist of conductive yarns woven or knitted into the fabric.

The stretchable touchpad 10 can be included in a wearable garment.

The wearable garment may include a control unit connected to said stretchable touchpad 10, for example by means of the routings 32, 42 and the contact pads 35, 45 in order to detect and analyze signals detected by the touchpad 10.

Figure 1B:
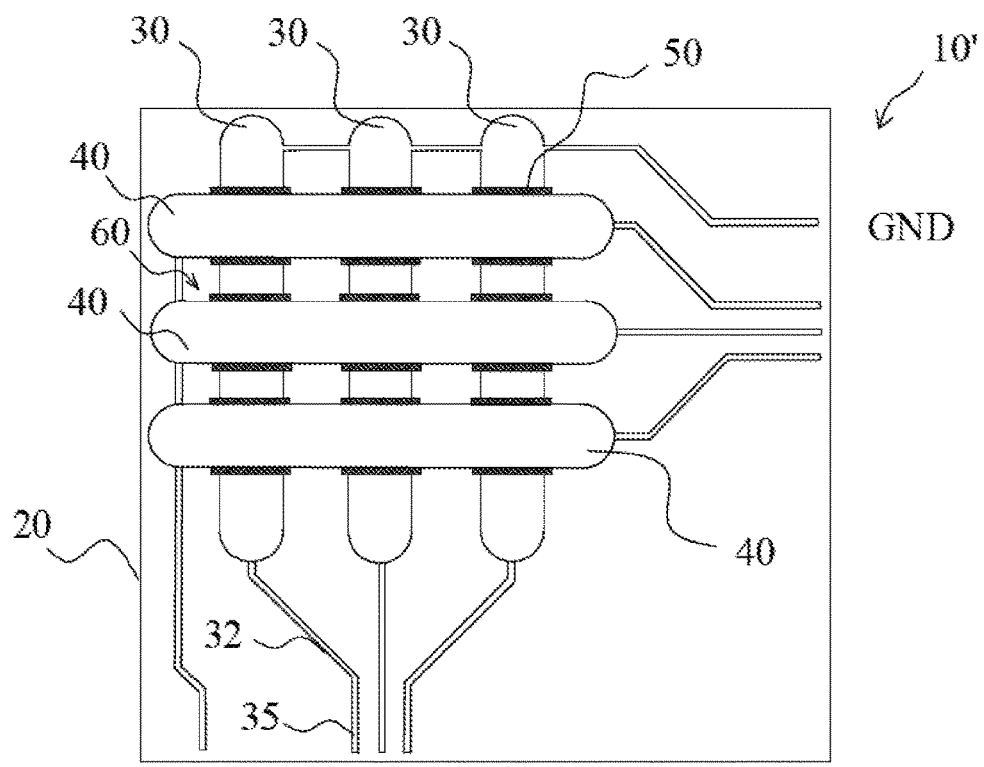
FIG. 1b shows a stretchable touchpad of the capacitive type according to another embodiment of the invention.

In FIG. 1b an alternative stretchable touchpad 10' of the capacitive type is represented, wherein each one of the conductive elements 30 and each one of the conductive elements 40 has one of the routings connected to the ground (GND).

Figure 2:
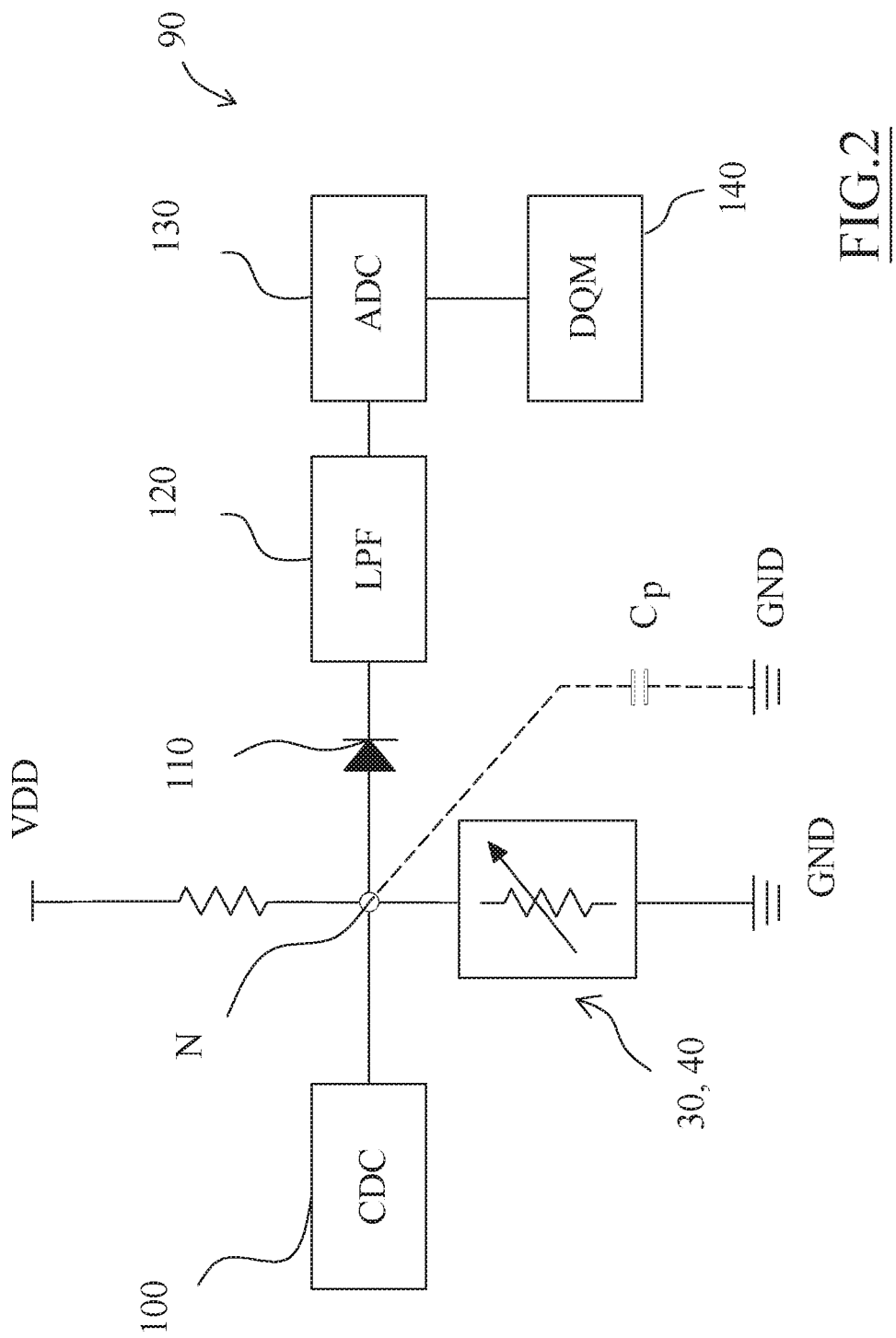
FIG. 2 shows a circuit diagram of a control unit suitable to read the output of anyone of the stretchable touchpads of FIGS. 1a and 1b.

A circuit diagram of a control unit 90 suitable to read the output of the stretchable touchpad 10 is represented in FIG. 2.

The control unit 90 comprises a capacitance-to-digital converter (CDC) 100 that is used to read-out each capacitive sensing electrode, namely the electrical signals provided by the resistive strain gauges 30, 40, for example when a user interacts with the touchpad 10.

More specifically, an electrical current is run through the strain gauges 30, 40 and a variable voltage is measured at point N of the circuit of FIG. 2, the measured voltage being representative of a variation of the electrical resistance of a resistive strain gauge 30, 40.

Even if not shown in the circuit of FIG. 2, the CDC 100 is also connected to the DQM 140 in such a way that the two measurements can be co-analyzed for the purpose of the invention. CDC 100 and DQM 140 are preferably part of a same microcontroller.

Therefore the CDC 100 may operate as a touch-event channel by reading out the capacitance Cp (depicted in dashed lines in FIG. 2), namely the parasitic capacitance due to touch events of a user which is coupled to the same electronic node N.

The control unit 90 comprises also a diode 110 and a low-pass filter (LPF) 120.

At the output of the diode 110, a voltage level representing the elongation of the resistive strain gauges 30, 40 when stretched can be read-out.

The low-pass filter (LPF) 120 operates in order to filter-out unwanted higher frequency components of the read out capacitance signal and the control unit 90 further comprises an analog-to-digital converter (ADC) 130 to digitize the output of the LPF 120.

The low-pass filter (LPF) 120 is preferably a fixed bandwidth low-pass filter.

The ADC 130 can be a separate element or can be integrated in a microcontroller and operates as an elongation event channel.

Finally the control unit 90 comprises a Data Quality Monitor (DQM) 140 for the visualization of the detection. The DQM 140 may be implemented as a software executed by a microcontroller and may also be placed between the CDC 100 and the node N to monitor touch events.

In general, when stretched, the impedance of the individual strain gauges 30, 40 changes, a phenomenon that in turn degrades the accuracy of detection of the parasitic capacitance variation.

In the above circuit of the control unit 90, therefore the various elements interact in order to detect a touch event while compensating for the errors due to the elongation of the individual sensors.

Figure 3:
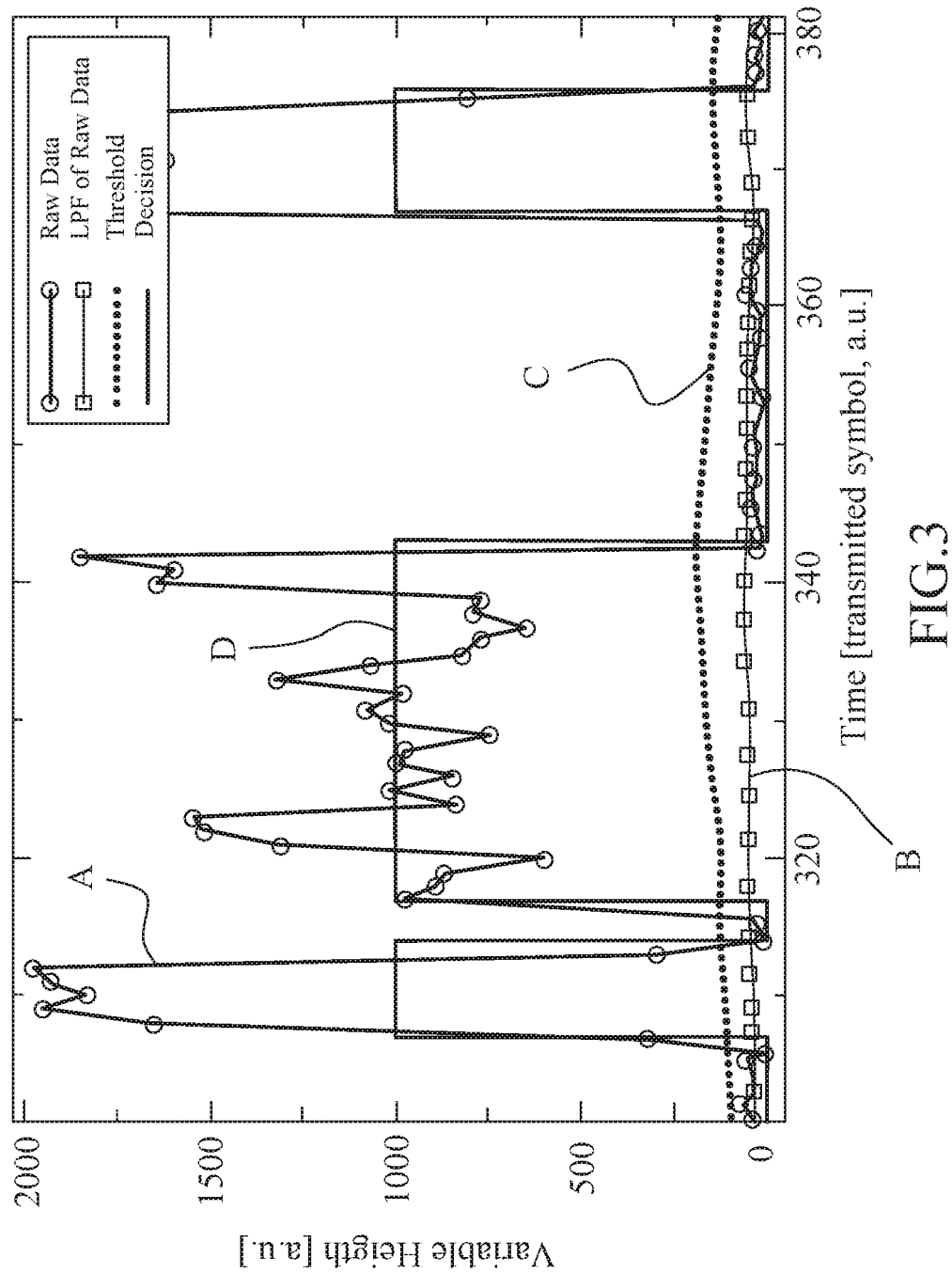
FIG. 3 shows a graph representing an example of the operation of the touch detection method according to an embodiment of the invention.

FIG. 3 shows a graph representing an example of the operation of the touch detection method according to an embodiment of the invention.

The touch detection method of the invention has the objective of increasing the sensitivity to touch event in wearable sensor with respect to the prior art, namely to allow detect a touch event only in case of intentional taps or touches considering the variation of impedance due to elongation of the strain gauges 30, 40.

As a first step, raw data representing different values of capacitance along time are tracked (curve A of FIG. 3) in an exemplary operation of the control unit 90 above described, wherein such values of capacitance may or may not be correlated to touch events.

Using the fixed bandwidth low-pass-filter (LPF) 120, a raw data average curve can be calculated (curve B), namely the raw data are filtered and the filtered data are running-averaged.

A variable threshold (Curve C) is then calculated on the basis of the filtered raw data average and the resistance of the strain gauge as a display of elongation of the sensor stripe.

As seen in FIG. 3, the first peak of actually measured data (detected touch) is much higher than the height of the second and longer detection starting at around reference 320 and ending at around reference 340. During this second touch event, the sensor stripe is elongated which is the main reason for lower measurement of touch at around 1000 on y-axis. The sensor stripe is gradually released during the touch event, which in turn gradually increases both the threshold (C) and the actual measurement (A) as the resistance drops.

In operation, in order to detect a touch event, the capacitance analog signal of the stretchable touchpad is measured continuously as depicted in curve A.

The measured capacitance signal is continuously compared with the threshold value of curve C in order to determine whether or not a touch event has taken place.

If the measured capacitance has a value greater that the variable threshold, it is determined that a touch event has occurred and a high logic value is outputted (curve D at level 1000).

On the contrary, if the measured capacitance has a value lower than the variable threshold C, it is determined that a touch event has not occurred and a low logic value is outputted (curve D at level 0).

As stated above, the value of the capacitance threshold is not fixed, but it is continuously adjusted as a function of the measured variation of electrical resistance of said resistive strain gauges 30, 40.

The measured variation of electrical resistance elongation is then used to correct a parasitic capacitance error due to the elongation of the resistive strain gauges 30, 40.

The implementation of such a method prevents random noise and non-intentional peaks from disturbing the touch event detection.

Of course the strain gauges are also used to monitor what is happening to the surface of the touchpad, for example, how a wearer of the garment is bending the joint on which such a garment is worn, in which direction and how much, as a strain gauge is capable of reporting such information.

This means that in the present invention the touch sensor and the strain gauge functions are performed by the same elements, namely the resistive strain gauges 30, 40.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

The invention claimed is:

1. A sensing device comprising a stretchable touchpad (10) of the capacitive type, the stretchable touchpad (10) including a uni- or bi-directionally stretchable textile fabric (20) having a plurality of conductive elements incorporated therein, wherein said conductive elements are resistive strain gauges (30, 40) which form electrodes that provide a change of capacitance signal caused by a touch, wherein said resistive strain gauges are disposed along perpendicular directions in a bi-directional array, said sensing device comprising a control unit configured to process said signal and configured to compare the measured capacitance signal with a threshold value in order to determine whether or not a touch has taken place, wherein said threshold value is continuously adjusted as a function of the actual measurement of capacitance and as a function of the resistance of resistive strain gauges (30, 40) which form the capacitor electrodes of said touchpad (10).

2. The sensing device according to claim 1, wherein said resistive strain gauges (30, 40) are disposed along perpendicular directions in a bi-directional array and wherein an insulating material (50) is placed at crossing points (60) of said resistive strain gauges (30, 40).

3. The sensing device according to claim 1, wherein said resistive strain gauges (30, 40) comprise resistive elastomeric coatings screen printed onto the stretchable textile fabric (20).

4. The sensing device according to claim 1, wherein said resistive strain gauges (30, 40) comprise conductive yarns woven or knitted into the fabric (20).

5. The sensing device according to claim 1, wherein said resistive strain gauges (30, 40) comprise resistive elastomeric coatings screen printed onto stripes.

6. The sensing device according to claim 1, wherein said stretchable textile fabric (20) has different elongation properties in two perpendicular directions.

7. A wearable garment including the sensing device according to claim 1.

8. A method for operating the sensing device according to claim 1, the method comprising the steps of:
measuring continuously a capacitance analog signal provided by the stretchable touchpad (10); and
comparing the measured capacitance signal with a threshold value in order to determine whether or not a touch has taken place,
wherein said threshold value is continuously adjusted as a function of the actual measurement of capacitance and as a function of the resistance of resistive strain gauges (30, 40) which form the capacitor electrodes of said touchpad (10).

9. A method for operating the sensing device according to claim 8, the method further comprising the steps of:
measuring a variation of the electrical resistance of the resistive strain gauge (30, 40);
using the measured variation of electrical resistance due to elongation to correct a parasitic capacitance error due to the elongation of the resistive strain gauges (30, 40).

10. The sensing device according to claim 1, wherein said control unit (90) is connected to said stretchable touchpad (10) in order to analyze the signal of a parasitic capacitance detected by said touchpad (10).

* * * * *